United States Patent [19]

Henoch

[11] 4,390,880

[45] Jun. 28, 1983

[54] RADIO COMMUNICATION SYSTEM AND TRANSMITTER AND RECEIVER EQUIPMENT THEREFOR

[75] Inventor: Bengt Henoch, Skärholmen, Sweden

[73] Assignee: Stiftelsen Institute for Mikrovagstenknik vid Tekniska Hogskolan i Stockholm, Stockholm, Sweden

[21] Appl. No.: 191,501

[22] Filed: Sep. 29, 1980

Related U.S. Application Data

[63] Continuation-in-part of Ser. No. 828,031, Aug. 26, 1977, abandoned.

[30] Foreign Application Priority Data

Sep. 2, 1976 [SE] Sweden .............................. 7609732

[51] Int. Cl.³ ............................................. G01S 13/80
[52] U.S. Cl. ................................................. 343/6.8 LC
[58] Field of Search ....................... 343/6.8 R, 6.8 LC

[56] References Cited

U.S. PATENT DOCUMENTS

| | | | |
|---|---|---|---|
| 3,689,885 | 9/1972 | Kaplan et al. | 343/6.8 LC X |
| 3,701,150 | 10/1972 | Dame | 343/6.8 R X |
| 3,713,148 | 1/1973 | Cardullo et al. | 343/6.8 R |
| 4,068,232 | 1/1978 | Meyers et al. | 343/6.8 R |
| 4,114,151 | 9/1978 | Denne et al. | 343/6.8 R X |

*Primary Examiner*—T. H. Tubbesing
*Attorney, Agent, or Firm*—LeBlanc, Nolan, Shur & Nies

[57] ABSTRACT

A system providing radio communication between a first station and at least one additional station wherein the first station is equipped to transmit an interrogation signal and also an information-bearing signal having a key signal component and an information signal component, wherein the additional station is equipped to receive the information-bearing signal and to store the information contained in the information signal component in a read/write memory only when the key signal component corresponds to a pre-selected key code, and wherein the additional station provides for the transmission of the stored information upon the reception of the interrogating signal to facilitate the reception of such information at the first station.

8 Claims, 2 Drawing Figures

RADIO COMMUNICATION SYSTEM AND TRANSMITTER AND RECEIVER EQUIPMENT THEREFOR

RELATED APPLICATION

This application is a continuation-in-part of my copending now abandoned application Ser. No. 828,031, filed Aug. 26, 1977 for Device At Apparatus For The Recording Of Objects, etc.

FIELD OF INVENTION

This invention relates to radio communication systems wherein an information-bearing signal is transmitted from a transmitter-receiver station upon reception of an interrogatoring signal.

BACKGROUND

In U.S. application Ser. No. 667,306 (filed Mar. 16, 1976), now U.S. Pat. No. 4,242,661, a device for recording a first type of objects, so-called recording objects, is shown which moves relative to a second type of objects, called recording places. The recording objects, for example, may be vehicles, and the recording places may be placed along a road section passed by the vehicles. The device comprises a number of recording units mounted one in each recording place or on each recording object and a number of recording transducers one on each recording object and, respectively, in each recording place. Each recording unit comprises a transmitter and a receiver with an indication unit, and each recording transducer includes a frequency converter for converting a first signal received from said transmitter into a second signal without supplying new energy to the signal, which second signal is frequency-shifted by a certain amount relative to the first signal, and a coding means to provide said second signal with a code individual for the recording transducer, and a transmitter means for transmitting said second coded signal.

The receiver of the recording unit is arranged to receive said second signal, and its indication means is arranged to indicate said code. The frequency converter includes a phase modulator, which modulates the first signal in such a manner that at least one sideband or side frequency is formed. The coding means is adapted to provide the sideband or side frequency with said code individual for the recording transducer, preferably by starting and stopping said modulator according to a pattern constituting said code.

SUMMARY OF INVENTION

The present invention is particularly concerned with an improved transponder (identified above as the recording transducer) for the type of communication system described above. According to the illustrated embodiment of this invention, the recording transducer comprises a transmitter-receiver unit which is equipped to receive an incoming signal containing a key signal component and an information-bearing signal component, to write the received information-bearing signal component into an electrically programmable memory (e.g., a RAM) if the received key-signal component corresponds to a stored key code, and to use the thusly stored information to modulate a further signal which is emitted by the recording transducer for transmission to a remote receiving station. The information stored in the aforesaid memory may be a further code for identifying the particular recording transducer in which it is stored.

A specific embodiment of the invention will now be described, with reference to the below-described drawings.

DETAILED DESCRIPTION

Figure 1:
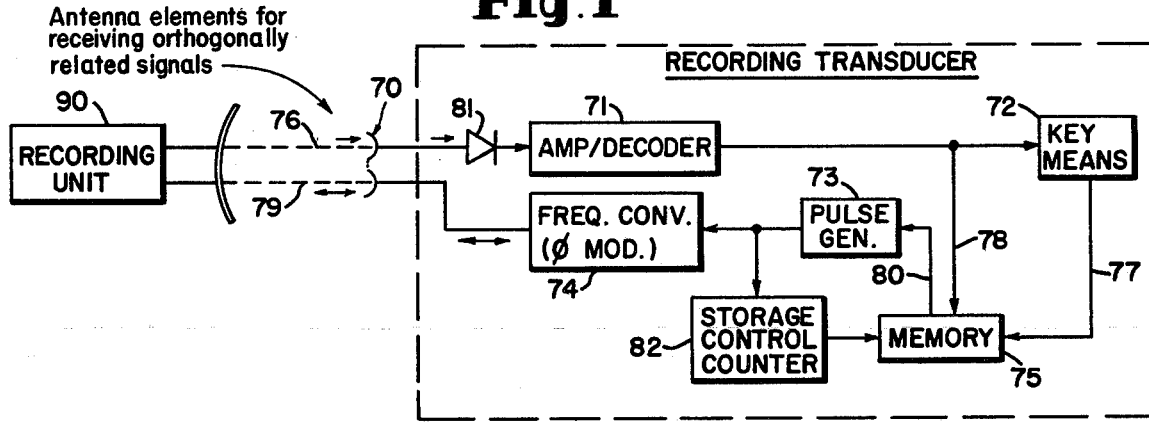
FIG. 1 is a block diagram of a communication system containing a recording transducer according to one embodiment of this invention.

Referring to FIG. 1, the recording transducer incorporating the principles of this invention is shown to comprise a combined receiving and transmitting antenna 70, an amplifier 71, a key means 72, a sawtooth pulse generator 73, a frequency converter 74 and an electronically programmable, integrated circuit memory 75. Memory 75 may be a random access memory (RAM). As will be described in detail shortly, the illustrated recording transducer is adapted to deliver stored information to a recording unit (indicated at 90 in FIG. 1) upon instruction or request therefrom. The storing of information in memory 75 of the recording transducer is carried out as described below.

A signal 76, which is coded, is emitted from recording unit 90 to the recording transducer and received by the antenna 70 thereof. Signal 76 includes a key signal component, which is of such a nature that if it corresponds to a pre-selected key code, it actuates the key means 72, which, in turn, puts memory 75 in condition for storing coded binary information, which is contained in signal 76 in the form of a pulse train.

More specifically, signal 76 may be modulated onto an appropriate radio wave by an unshown modulator in recording unit 90. The thusly modulated carrier wave is transmitted from recording unit 90 for reception at antenna 70 of the recording transducer. Such modulation at recording unit 90 may be of any suitable type, such as amplitude modulation. For example, the amplitude modulation may be 100% such that the carrier or radio frequency signal is transmitted in pulse-representing bursts. It will be appreciated that any suitable means may be employed for transmitting signal 76.

The received, modulated carrier wave at antenna 70 is fed to an envelope detector 81 (which may be a simple rectifying diode) where it is detected (demodulated) to recover or retrieve the modulating signal, which in this instance is signal 76. Signal 76 may be said to be made up of two separate signals or signal components which are transmitted one after the other, one being the above-mentioned key signal component, and the other being the information bearing signal component. It is understood that even though the information bearing signal and the key signal are referred to as components of signal 76, they are not modulated onto the radio wave simultaneously, but instead are transmitted one after another as explained above. The key signal component immediately precedes the information-bearing signal component in immediately precedes the informatin-bearing signal component in signal 76. Each of the key and information-bearing signal components in signal 76 is advantageously a binary coded digital signal in the form of a pulse train.

Following detection (rectification) at detector 81, signal 76 is fed to the amplifier circuit 71 which amplifies the signal. Amplifier circuit 71 also includes a decoding means for decoding the coded information in signal 76. The key means 72 is connected to the output of amplifier circuit to receive the key signal component in signal 76.

Key means 72 compares the received key signal with a key code which is stored in the key means, and if the received key signal corresponds to the stored key code, key means 72 operates to feed a write signal to memory 75 via conductor 77. The write signal places memory 75 in its write mode and hence in a condition to store incoming data or information. The information-bearing signal or signal component of signal 76 is fed via a conductor 78 to the data input of memory 75 and is stored in memory if the received key signal component conforms to the stored key code to cause the generation of the write signal on conductor 77.

The key signal mentioned above is of such a nature to keep reflections from an emitted signal or a signal emitted from an unknown transmitter from placing memory 75 in its write mode. In this manner the operation of key means 72 with the key signal has the effect of avoiding or reducing the chance of storing undesired information in memory 75. A suitable known means for controlling the storage of information in memory 75 is designated at 82. After the storing of all information, the key means 72 removes the write signal from memory 75 so that memory 75 is rendered incapable of storing undesirable information. The pulse amplifier 71, key means 72 and memory 75 are of suitable, known types. The memory capacity in the memory may be, for example, 64 bits. A voltage source, for example a battery with long service life, powers the memory unit so that the information fed into the memory is retained. The data speed of the memory is 10 kilobits per second, which is sufficient to transfer five complete code words of 8 bits each when the relative speed between the recording transducer and the recording unit is about 130 km/hour. Each code word comprises 8 bits.

Read-out of information stored in memory 75 and transmission of the read-out information from the recording transducer proceeds as follows.

The recording unit 90 is selectively operated to emit an interrogation signal 79 (a radio frequency wave) to the recording transducer. This interrogation signal is preferably orthogonal to signal 76 (i.e., to the radio wave modulated by signal 76) and is received by the recording transducer to initiate transmission of the information stored in memory 75. The information read out of memory 75 in the form of a digital binary coded pulse signal (indicated at 91 in FIG. 2) is fed via conductor 80 to generator 73. The control means 82 controls the delivery or read-out of the stored information from memory 75. Generator 73 is controlled by the read-out signal on conductor 80 in such a manner that it emits a pulsating sawtoothed shaped signal (indicated at 92 in FIG. 2), which corresponds to the pulse signal 91. Pulse signal 92 corresponds to the pulse train identified at 26p in FIG. 2 of the aforementioned application Ser. No. 667,306. The coded sawtooth signal emitted by generator 73 is impressed on phase modulating diodes (not shown) in frequency converter 74, which may be of the same type as disclosed in the aforementioned application Ser. No. 667,306.

As a result, frequency converter 74 emits to the antenna 70 a sideband which is provided with a code corresponding to the coded sawtooth shaped signal 92. The sideband signal is fed to antenna 70 from which it is re-emitted to the recording unit 90. Upon reception of the coded sideband signal recording unit 90 decodes it and processes it further to recover the transmitted information in the manner described in the aforesaid application Ser. No. 667,306.

The information stored in memory 75 may be an identification code, which identifies and is individual to the particular recording transducer in which it is stored. Thus, the sideband signal transmitted from the illustrated recording transducer in response to the reception of the interrogating signal 79 will contain the stored identification code. The identification code or other information which is stored in memory 75 is to be distinguished from the key code, which is stored in key means 72. The key code may be the same for a large number of recording transducers in the overall communication system because the purpose of key means 72 is to prevent memory 75 from being keyed (i.e., placed in its write mode) by spurious signals.

Antenna 70 is advantageously a combined transmitting and receiving antenna of suitable, conventional construction. Antenna 70 may be the same as the one described in the previously identified application Ser. No. 667,306. Advantageously, the radio wave containing the information and key signals (76) is emitted from recording unit 90 with a polarization that is orthogonal to the interrogating signal 79, which is also emitted by the recording unit 90. The recording transducer is connected to the antenna 70 so that the input to the pulse amplifier 71 is sensitive to signals with a polarization corresponding to that of the radio wave containing signal 76, while the input and output for the frequency converter 74 is sensitive to signals with a polarization orthogonal to the input of the pulse amplifier. From this description it will be appreciated that the receiver in the recording transducer is equipped with two channels 96 and 97 (see FIG. 2) in which signal 76 is received in channel 96, but not channel 97, and in which signal 79 is received in channel 97, but not channel 96.

As an example, the entire device has an energy consumption of about 1 Ah per year at 4.5 V, which with a battery having a long service life implies an operation time for the device of about 4 to 5 years.

A remote-programmable recording transducer according to the present invention renders it possible to enter the information concerning, for example, identity, load, destination, etc. in recording transducers disposed on trucks, railway cars or other vehicles and at a later occasion to take out the information by an interrogation signal from a recording unit.

The device according to the present invention can also be used, for example, at inputs and outputs for toll roads where vehicles in commercial traffic and also private vehicles are provided with said recording transducer, which among others includes the identification code of the vehicles, and in the memory of which the time for passage, tariff class etc. can be stored and fed out.

Figure 2:
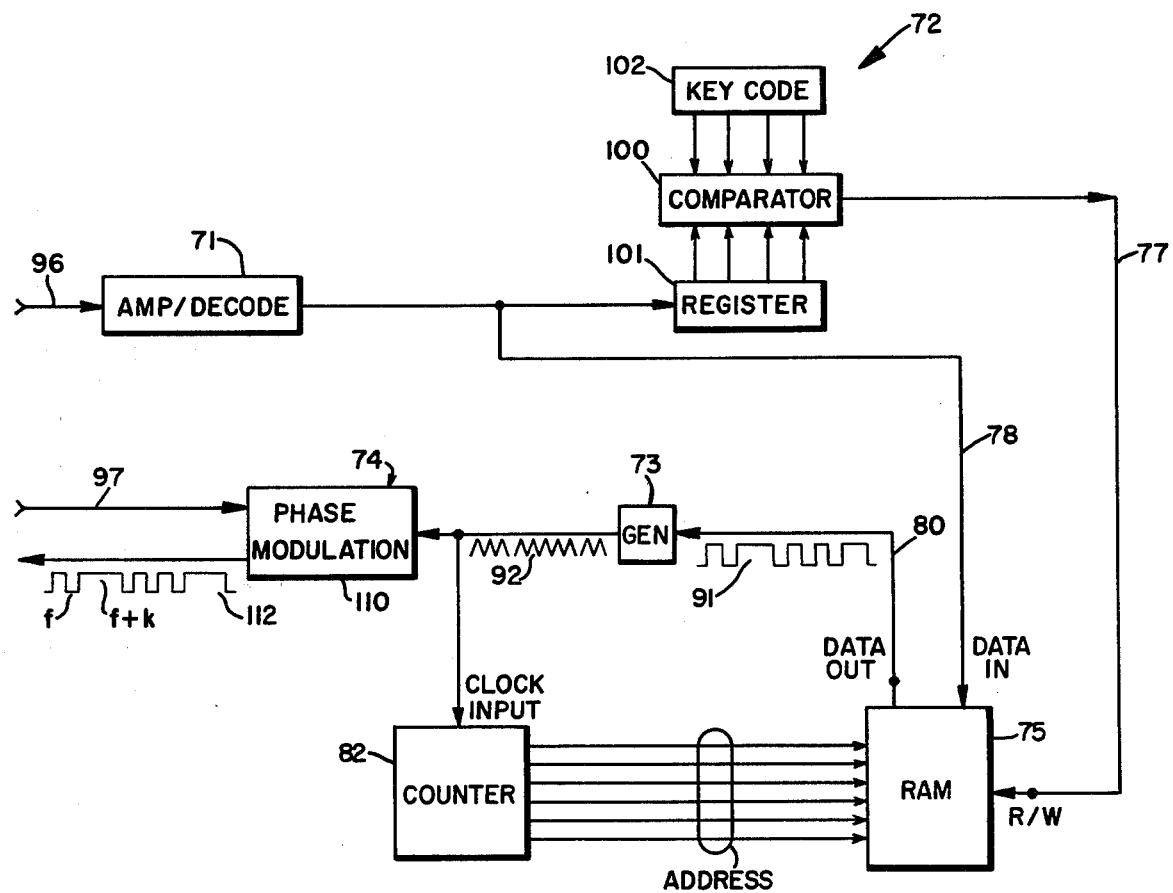
FIG. 2 is a further block diagram showing the recording transducer in greater detail.

Referring to FIG. 2, one suitable circuit design for the key means 72 is shown to comprise a plural bit comparator 100, a suitable plural bit shift register 101 and a suitable code storage device or circuit 102. Circuit 102 provides or stores the key code in the form of a plural bit word and parallel feeds the bits making up the key code to one set of inputs of comparator 100. The received key signal component in signal 76 is entered into register 101 in the form of a plural bit word, and register 101 parallel feeds such plural bit word (which tooth signal is $K_2$. The unshown receiver in recording unit 90 is tuned to receive the above-mentioned side frequency $f+K_1$ and is equipped to decode and recover the coded information contained in the reflected signal which is emitted from the recording transducer. Alternatively, the circuit design of the unshown receiver in recording unit 90 may correspond to the one described in the commonly assigned copending Ser. No. 67,139 (now abandoned) (filed Aug. 16, 1979) where both frequencies of signal 112 are received and processed to recover the transmitted information.

It will be appreciated that the present invention is not restricted to the foregoing type of frequency-translating modulator and instead may be used with any suitable modulator. It also will be appreciated that antenna 70 may be of any suitable conventional construction for receiving the orthogonally polarized signals 76 and 79.

Finally, it will be noted that no frequency-selective, front-end band pass filters are utilized in the receiver portion of the recording transducer, for none is needed as is apparent from the foregoing description.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A system located at a first station to provide two-way radio communication with a second station wherein said second station is equipped to receive a radio signal and to transmit an interrogation radio signal and also an information-bearing radio signal having an information signal component and key signal component, said system comprising first means providing for the reception of said information-bearing signal but not said interrogation signal, second means for retrieving said information and key signal components from the information-bearing signal received by said first means, an electrically programmable read/write memory, third means for storing a preselected code, fourth means connected to said memory for enabling information to be written into and read out of said memory, said fourth means including a circuit for comparing the retrieved key signal component with said pre-selected code and for writing the information contained in said information signal component into said memory only if the retrieved key signal component corresponds to said code, fifth means for receiving said interrogation signal, but not said information-bearing signal and sixth means rendered effective upon the reception of said interrogation signal for transmitting the information stored in said memory in the form of a signal that is receivable by said second station.

2. The system defined in claim 1 wherein said circuit of said fourth means comprises a comparator having an output connected to a read/write terminal of said memory, there being means for feeding said key signal component to said comparator, and said comparator providing for the comparison of said key signal component with said code and for the delivery of a write signal to the read/write terminal of said memory only when said key signal component corresponds to said code, said memory being conditioned by said write signal to store the information contained in said information signal component.

3. The system defined in claim 1 wherein said memory is a random access memory.

4. A system located at a first station to provide two-way radio communication with a second station wherein said second station is equipped to receive a radio signal and to transmit an interrogation radio signal and also an information-bearing radio signal having an information signal component and key signal component, said system comprising first means providing for the reception of said information-bearing and interrogation signals, second means for retrieving said information and key signal components from said information-bearing signal, an electrically programmable read/write memory, third means for storing a preselected code, fourth means connected to said memory for enabling information to be written into and read out of said memory, said fourth means including a circuit for comparing the retrieved key signal component with said preselected code and for writing the information contained in said information signal component into said memory only if the retrieved key signal component corresponds to said code, and fifth means rendered effective upon the reception of said interrogation signal for transmitting the information stored in said memory in the form of a signal that is receivable by said first station, said interrogating and information-bearing signals being dissimilarly polarized, and said first means including first antenna means oriented to receive said information-bearing signal but not said interrogation signal, and second antenna means oriented to receive said interrogation signal but not said information-bearing signal.

5. A system located at a first station to provide two-way radio communication with a second station wherein said second station is equipped to receive a radio signal and to transmit an interrogation radio signal and also an information-bearing radio signal having an information signal component and key signal component, said system comprising first means providing for the reception of said information-bearing signal but not said interrogation signal, second means for retrieving said information and key signal components from the information-bearing signal received by said first means, an electrically programmable read/write memory, third means for storing a pre-selected code, fourth means connected to said memory for enabling information to be written into and read out of said memory, said fourth means including a circuit for comparing the retrieved key signal component with said preselected code and for writing the information contained in said information signal component into said memory only if the retrieved key signal component corresponds to said code, said circuit of said fourth means comprising a comparator having an output connected to a read/write terminal of said memory, there being further means for applying said key signal component to said comparator, and said comparator providing for the comparison of said key signal component with said code and for the application of said write signal to the read/write terminal of said memory only when said key signal component corresponds to said code, said memory being conditioned by said write signal to store the information contained in said information signal component, and said comparator being effective to apply a read signal to said read/write terminal to place said memory in its read mode upon sensing the absence of a signal corresponding to said code, fifth means for receiving said represents the key signal component) to the second set of inputs of comparator 100 for comparison with the key code. The output of comparator 100 is connected to the read/write input of memory 75.

Comparator 100 may be of any suitable design such as the commercially available Texas Instruments comparator type SN5485, among others. Memory 75 may also be of any suitable design such as the commercially available Motorola random access memory type MCM 14505. Likewise, the control means 82 may be any suitable counter (82 is hereinafter referred to as the control counter), such as the Motorola plural bit binary counter type MC 14040B for addressing the different storage locations in memory 75.

With the foregoing circuit design, the output of comparator 100 is connected by line 77 to the read/write input terminal of memory 75, the output of the amplifier circuit 71 is connected by line 78 to the data input terminal of memory 75, the data output terminal of memory 75 is connected by line 80 to generator 73, and the outputs of the individual stages in control counter 82 are connected in parallel to the address input terminals of memory 75. The output of generator 73 may advantageously be connected to the clock input of control counter 82 as well as to the frequency converter 74 which, as will be explained in greater detail later on, may be a phase modulator. The binary address signal supplied at the outputs of the individual stages of counter 82 is in the form of a plural bit word.

When the digital signal at the read/write terminal of memory 75 is high, memory 75 is placed in its write mode, and when the digital signal at the memory's read/write terminal is low, memory 75 is in its read mode. When memory 75 is in its write mode, the digital information fed to its data input terminal will be written into and stored at memory storage locations which are determined by the addresses furnished by the control counter 82. When memory 75 is in its read mode, the data or digital information stored in the memory will be read out in accordance with the addresses furnished by control counter 82.

With the foregoing circuitry, it is evident that upon reception of signal 76, the bits making up the digital key signal component will be entered into register 101, thereby providing for the comparison of the received key signal with the stored key code. If the received key signal corresponds to the stored key code, comparator 100 will produce a pulse (a high) of limited duration at its output and hence at the read/write terminal of memory 75, thus placing the memory in its write mode. With memory 75 in its write mode, the information bits, which make up the digital information signal component in signal 76 and which are fed to the memory over line 78, will be stored in memory 75 at addresses determined by the output of control counter 82. The duration of the write pulse supplied at the output of comparator 100 is so selected that it will enable all of the bits in the digital information signal component of signal 76 to be stored in memory 75. Upon termination of this write pulse, the logic level at the output of comparator 100 and hence at the read/write input of memory 75 goes low, thus causing memory 75 to automatically revert to its read mode. Thus, memory 75 will normally be in its read mode in the absence of the reception of a key signal corresponding to the key code. The stored binary information read out of memory 75 is in the form of a binary coded pulse signal as indicated at 91 in FIG. 2.

The operation of control counter 82 may be accomplished in a number of different ways. However, in accordance with a further feature of this invention, counter 82 is driven by pulse generator 73. This is accomplished by running generator 73 all of the time to thereby feed the generator's sawtooth pulses to the counter's clock pulse input all of the time. The response of generator 73 to the binary pulse signal 91 is such that the output sawtooth signal voltage 92 will have a first pre-selected frequency ($K_1$) when the binary logic state or level of pulse signal 91 is high (a binary 1) and that the output sawtooth signal voltage 92 will have a second and different pre-selected frequency ($K_2$) when the binary logic state or level of pulse signal 91 is low (a binary 0). Thus, generator 73 will continuously emit sawtoothed shaped pulses at either the frequency $K_1$ or the frequency $K_2$, depending upon the binary logic state at the generator's input, which will be either high or low throughout the operation of the unit. Counter 82 will therefore be counting all of the time to thus advance the count in the counter. When the counter becomes fully loaded, it automatically resets. In this manner, the various storage locations in memory 75 will be successively and recurrently addressed. Instead of using generator 73 to drive control counter 82, it will be appreciated that a separate, continuously running pulse generator (not shown) could be used to drive counter 82.

From the foregoing description it will be appreciated that generator 73 supplies pulses to counter 82 throughout the time in which memory 75 is in its read mode and also in its write mode. During both modes, counter 82 is therefore counting to successively address the different storage locations in memory 75. Generator 73 may be of any suitable conventional circuit design. For example, it may have a capacitance which is switched in and out of the active circuit in response to the logic states in signal 91 to thus provide signal 92 with frequency $K_1$ when the logic state of signal 91 is high and frequency $K_2$ when the logic state of signal 91 is low.

The generator's sawtooth signal 92 is applied to the unshown phase modulating diodes in frequency converter 74, which as previously described comprises a phase modulator (as indicated at 110 in FIG. 2). Phase modulator 110 may be a single side band modulator such as the one disclosed in "IEE Transactions on Microwave Theory and Techniques", Vol. MTT-19, No. 1, January, 1971, pages 103–105 in article entitled "A 360° Reflection Type Phase Modulator".

When the interrogating signal 79 is transmitted by recording unit 90 and received at antenna 70, it will be fed to the unshown phase modulating diodes in the above mentioned frequency-converting phase modulator 110. Signal 79 will be reflected back to antenna 70 by the phase modulating diodes and will therefore be emitted as a reflection from the recording transducer. In response to the sawtooth voltage of generator 73, the phase of the received signal 79 will be rotated at an essentially constant rate causing a change in the frequency in the signal reflected from the phase modulator, and the frequency of the reflected signal will depend upon the rate of phase rotation and is considered to be a side frequency or side band of signal 79. If the frequency of the received interrogating signal 79 is f, then the frequency of the reflected signal (indicated at 112 in FIG. 2) will be a first side frequency $f+K_1$ when the frequency of the sawtooth signal is $K_1$ and a second side frequency $f+K_2$ when the frequency of the sawinterrogation signal, but not said information-bearing signal, and sixth means rendered effective upon the reception of said interrogation signal for transmitting the information stored in said memory in the form of a signal that is receivable by said second station when said memory is in its read mode.

6. A system located at a first station to provide two-way radio communication with a second station wherein said second station is equipped to receive a radio signal and to transmit an interrogation radio signal and also an information-bearing radio signal having an information signal component and key signal component, said system comprising antenna means for emitting signals and also for receiving said information-bearing and interrogation signals, first means for retrieving said information and key signal components from the received information-bearing signal, an electrically programmable read/write memory, second means for storing a pre-selected code, third means connected to said memory for enabling information to be written into and read out of said said memory, said third means including a circuit for comparing the retrieved key signal component with said pre-selected code and for writing the information contained in said information signal component into said memory only if the retrieved key signal component corresponds to said code, and fourth means rendered effective upon reception of said interrogation signal for supplying the information stored in said memory in the form of a modulated signal that is receivable by said second station, said antenna means having an antenna electrically connected to said fourth means for emitting said modulated signal, and said fourth means including a pulse generator, a counter and a modulator, said memory having a data output connected to said generator for feeding information stored in the memory to said generator in the form of a digital signal when said memory is in its read mode, said generator being responsive to said digital signal for producing a further signal which is coded to contain the information read out of said memory and which is formed with serially occurring pulses, said counter being connected to said pulse generator for counting the pulses supplied by said generator and having an output connected to said memory for addressing different storage locations in said memory in accordance with the pulse count in the counter, and said modulator being connected to said generator to modulate a signal with said further signal to develop said modulated signal.

7. A system located at a first station to provide two-way radio communication with a second station wherein said second station is equipped to receive a radio signal and to transmit an interrogation radio signal and also an information-bearing radio signal having an information signal component and key signal component, said system comprising antenna means for emitting signals and also for receiving said information-bearing and interrogation signals, first means for retrieving said information and key signal components from the received information-bearing signal, an electrically programmable read/write memory, second means for storing a pre-selected code, third means connected to said memory for enabling information to be written into and read out of said memory, said third means including a circuit for comparing the retrieved key signal component with said pre-selected code and for writing the information contained in said information signal component into said memory only if the retrieved key signal component corresponds to said code, and fourth means rendered effective upon reception of said interrogation signal for supplying the information stored in said memory in the form of a modulated signal that is receivable by said second station, said antenna means having an antenna electrically connected to said fourth means for emitting said modulated signal, and said fourth means including a pulse generator, a counter and a modulator, said memory having a data output connected to said generator for feeding information stored in the memory to said generator in the form of a digital signal when said memory is in its read mode, said generator being responsive to said digital signal for producing a further signal which is coded to contain the information read out of said memory and which is formed with serially occurring pulses, said counter being connected to said pulse generator for counting the pulses supplied by said generator and having an output connected to said memory for addressing different storage locations in said memory in accordance with the pulse count in the counter, and said modulator being connected to said generator to modulate said interrogating signal with said further signal to develop said modulated signal.

8. A system located at a first station to provide two-way radio communication with a second station wherein said second station is equipped to receive a radio signal and to transmit an interrogation radio signal and also an information-bearing radio signal having an information signal component and key signal component, said system comprising antenna means for emitting signals and also for receiving said information-bearing and interrogation signals, first means for retrieving said information and key signal components from the received information-bearing signal, an electrically programmable read/write memory, second means for storing a pre-selected code, third means connected to said memory for enabling information to be written into and read out of said memory, said third means including a circuit for comparing the retrieved key signal component with said pre-selected code and for writing the information contained in said information signal component into said memory only if the retrieved key signal component corresponds to said code, and fourth means rendered effective upon reception of said interrogation signal for supplying the information stored in said memory in the form of a modulated signal that is receivable by said second station, said antenna means having an antenna electrically connected to said fourth means for emitting said modulated signal, and said fourth means including a pulse generator, a counter and a modulator, said memory having a data output connected to said generator for feeding information stored in the memory to said generator in the form of a digital signal when said memory is in its read mode, said generator being responsive to said digital signal for producing a further signal which is coded to contain the information read out of said memory and which is formed with serially occurring pulses, said counter being connected to said pulse generator for counting the pulses supplied by said generator and having an output connected to said memory for addressing different storage locations in said memory in accordance with the pulse count in the counter, and said modulator being connected to said generator to phase modulate said interrogating signal with said further signal to develop said modulated signal.

* * * * *